United States Patent [19]

Demrick

[11] 4,130,933

[45] Dec. 26, 1978

[54] FORMING AND COATING APPARATUS

[75] Inventor: Carl J. Demrick, Birmingham, Mich.

[73] Assignee: Arco Industries Corporation, Schoolcraft, Mich.

[21] Appl. No.: 832,700

[22] Filed: Sep. 12, 1977

[51] Int. Cl.$^2$ .......................... B23P 23/00; B21B 15/00; B21F 11/00

[52] U.S. Cl. .......................... 29/564; 29/33 Q; 29/33 S; 72/405

[58] Field of Search .......................... 29/33 Q, 33 S, 563, 29/564, 527.2, 527.3; 72/325, 332, 337, 405, 406; 118/66, 67

[56] References Cited

U.S. PATENT DOCUMENTS

| | | | |
|---|---|---|---|
| 2,297,948 | 10/1942 | Eisenhauer | 72/405 |
| 2,316,984 | 4/1943 | Brockel | 118/67 |
| 2,339,884 | 1/1944 | Schumpf | 29/33 Q |
| 2,925,847 | 2/1960 | Buyns | 29/33 Q |
| 3,039,187 | 6/1962 | Kennedy | 72/337 |
| 3,074,150 | 1/1963 | Berg | 72/325 |
| 3,453,855 | 7/1969 | Morita | 72/405 |
| 3,461,708 | 8/1969 | Pepe | 72/405 |
| 3,510,933 | 5/1970 | Taylor | 72/405 |
| 4,010,524 | 3/1977 | Osamu | 29/33 S |

*Primary Examiner*—Othell M. Simpson
*Assistant Examiner*—G. Weidenfeld
*Attorney, Agent, or Firm*—Reising, Ethington, Barnard Perry & Brooks

[57] ABSTRACT

The present invention relates to a new and improved apparatus for the high speed and continuous forming of parts requiring a protective plastic coating to be deposited over a portion of such parts.

25 Claims, 7 Drawing Figures

FORMING AND COATING APPARATUS

The present invention relates to a new and improved apparatus for the high speed and continuous forming of parts requiring a protective plastic coating deposited over a portion thereof. Such plastic coating is intended to protect the part against abrasion, erosion, rusting or the like. For purposes of illustrating the invention, the apparatus is depicted and described as manufacturing clips. While clips have many applications, those illustrated in the subject invention are particularly applicable to the vehicle industry where such clips are used to support members such as mechanical cables, hydraulic lines, electrical wiring and the like.

It is the purpose of the present invention to provide a fully automated apparatus which receives strip stock, usually metal, at one end and produces discrete plastic coated parts at the other end without any intervening manual steps.

BACKGROUND

Prior to the subject invention, such parts have been made in a manner requiring at least two distinct and separate processes, one to form and the second to coat the part and which processes required intermediate manual operations such as transporting from a forming apparatus and reloading of the parts on a coating apparatus. Two common types of parts which the subject invention is used to manufacture are U or J type clips. The designations refer to the general cross-sectional shape of such clips. In the past such clips have commonly been made in multi-step processes comprising: forming the clips from strip stock and cutting them off to provide individual clips, applying a primer coating to batch quantities of clips, and thereafter reloading the clips on another machine to apply and cure the plastic coating. Bulk transportation or manual handling is required between the forming, priming, and coating steps of the process. With such multi-step processes, typically one person can attend to two clip forming machines and produce 10,000 uncoated clips per hour. In addition to providing personnel to transport the thus formed clips to the priming and coating operations, four additional people are required to reload the individual clips on a suitable machine for dipping and curing in order to produce 10,000 finished clips per hour. This rate of five people to produce 10,000 coated clips per hour has been generally the same for U or J type clips.

PRESENT INVENTION

By contrast, the apparatus of the subject invention utilizes one person to continuously produce U clips at the rate of 15,000 per hour or J clips at the rate of 30,000 per hour. Thus, the present invention produces plastic coated U clips at 150% of the previous hourly rate utilizing one-fifth as much labor. At the same time, the J clip is produced at 300% of the previous hourly rate, again using one-fifth as many people. It is apparent, therefore, that the subject clip forming and coating apparatus has resulted in a greatly reduced cost for the production of clips or other plastic coated parts.

The following is a brief summary of the subject method and apparatus as adapted to the production of plastic coated clips. While any suitable part material may be used, such as ferrous or non-ferrous metals, the invention will be described as fabricating the parts from steel strip stock. The apparatus is provided with a source of coiled strip steel which is first fed into an automatic uncoiler and straightening device from which the strip stock is fed to a precision stock feeder attached to a forming press. The forming press includes a die where the strip is progressively pierced, slotted, formed, trimmed, and bent to the clip shape desired for coating purposes. However, at this point the formed clips are not cut off and remain connected by short tabs to provide a continuous, chain-like, flexible clip strip. The clips are in the form desired for coating purposes as they leave the progressive forming die.

As formed by the progressive die, the clips include one or more depending leg portions and it is normally only such leg portions which are to be plastic coated while leaving some portion of the clips uncoated.

The next step in the process includes feeding the connected and formed clips to the part of the apparatus wherein the plastic coating is applied. After forming, the clip strip is fed at a continuous rate through that part of the apparatus where the coating is applied. However, inasmuch as the clip strip movement through the progressive die is intermittent and faster than the rate at which it moves continuously through the coating portion of the apparatus, a first take-up device or strip accumulator is provided intermediate the progressive die and the coating portion of the apparatus , a first take-up device or strip accumulator is provided intermediate the progressive die and the coating portion of the apparatus to compensate for the different rates of clip strip movement. To this end, the take-up device automatically accumulates a certain length of clip strip which, when exceeded, shuts off the progressive die while allowing the coating apparatus to be supplied with a continuously moving clip strip. At such time as the accumulated strip length falls below a certain value in the take-up device, the progressive die is automatically restarted. Thus, while the coating operation continues at a continuous and steady rate, the clip forming operation is intermittent and automatically controlled by the rate of which the clips are coated.

When using uncoated steel, the clip strip leaves the first accumulator or take-up device and passes over a first pre-heating device immediately prior to entering a primer application station liquid primer-containing tank. The pre-heating step is to insure effective adherence of the primer material to the clip strip and, where a liquid primer is used, to drive off or vaporize any primer solvents as the strip leaves the primer station.

In the illustrated form of the apparatus, a liquid primer-containing tank or reservoir is depicted. An adjustable guide device is associated with the primer tank to control the depth to which the clips are primed as they pass through the primer tank. The primed clip strip next moves from the primer tank to pass over a high energy burner to further raise the temperature of the strip prior to entering a plastic applying station. While various methods of plastic deposition, such as a fluidized bed or sprayed powders, may be utilized, the apparatus illustrates the use of a dipping tank or reservoir containing a liquified plastic material. The temperature to which the strip is heated and its rate of movement are regulated to values which will determine the thickness of plastic deposited on the clips. The residual heat in the strip provides the energy for initially curing the plastic deposited on the clips. Thus, as the strip leaves the high energy burner, it passes into a tank of a suitable liquid plastic to a depth controlled in accordance with the extent to which the leg portions of the clips are to be coated with plastic. As the clip strip leaves the plastic containing tank or reservoir, the residual heat in the strip can effect the proper cure of the plastic. Depending on the type of clips being formed and the thickness of plastic being deposited thereon, means is provided to supplement or accelerate the cure rate of the plastic as well as to evenly distribute the plastic over the area of the clip being coated. One such means is to loop the plastic coated strip back over the exhaust heat of the high energy burner through a pair of suitable guide elements prior to severing the clips from the strip.

The plastic coated clip strip is continuously moved through the coating portion of the apparatus by a suitable variable speed traction device which engages the uncoated portion of the strip between a pair of suitable drive wheels. As the strip leaves the coating apparatus it passes through a water cooling device prior to being fed to a final form and cut-off die where the clips are automatically severed from the continuous strip. Once again, the cut-off die operates at a faster rate than that at which the continuous strip moves through the coating part of the apparatus. Accordingly, a second accumulator or take-up device is provided between the coating apparatus and the cut-off die which, as with the first take-up device, permits the coated plastic strip to accumulate and control the actuation of the final form and cut-off die to match its output rate with the output rate from the coating part of the apparatus.

As already noted, the invention is not to be limited to the type of part formed and coated by the subject apparatus. Any parts that can be formed so as to remain connected as a continuous chain-like, flexible strip able to be subjected to the temperature necessary to effect the cure of the plastic to be applied thereto can be utilized with the subject invention.

For purposes of illustration, the apparatus comprising the subject invention will be depicted and described as forming and coating metal clips of the type commonly used in the manufacture and assembly of vehicles.

The details of the apparatus are set forth in the drawings and the description which follows.

Figure 4A:
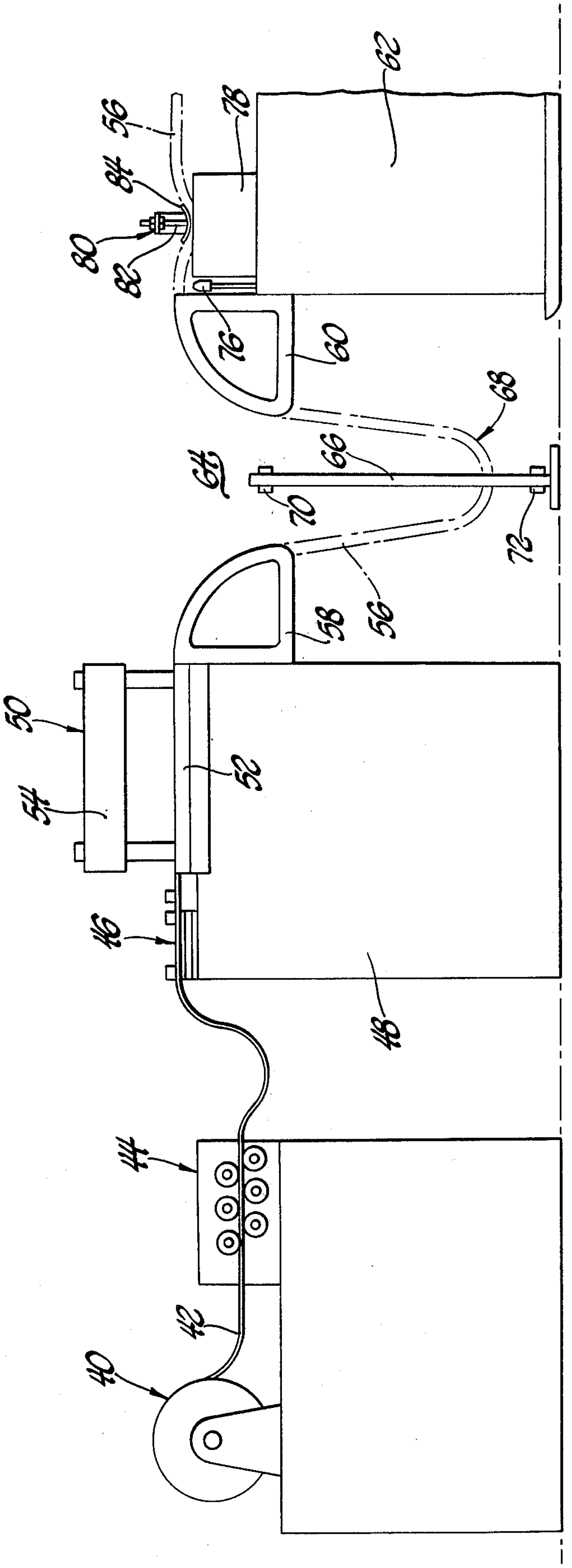
Figure 4B:
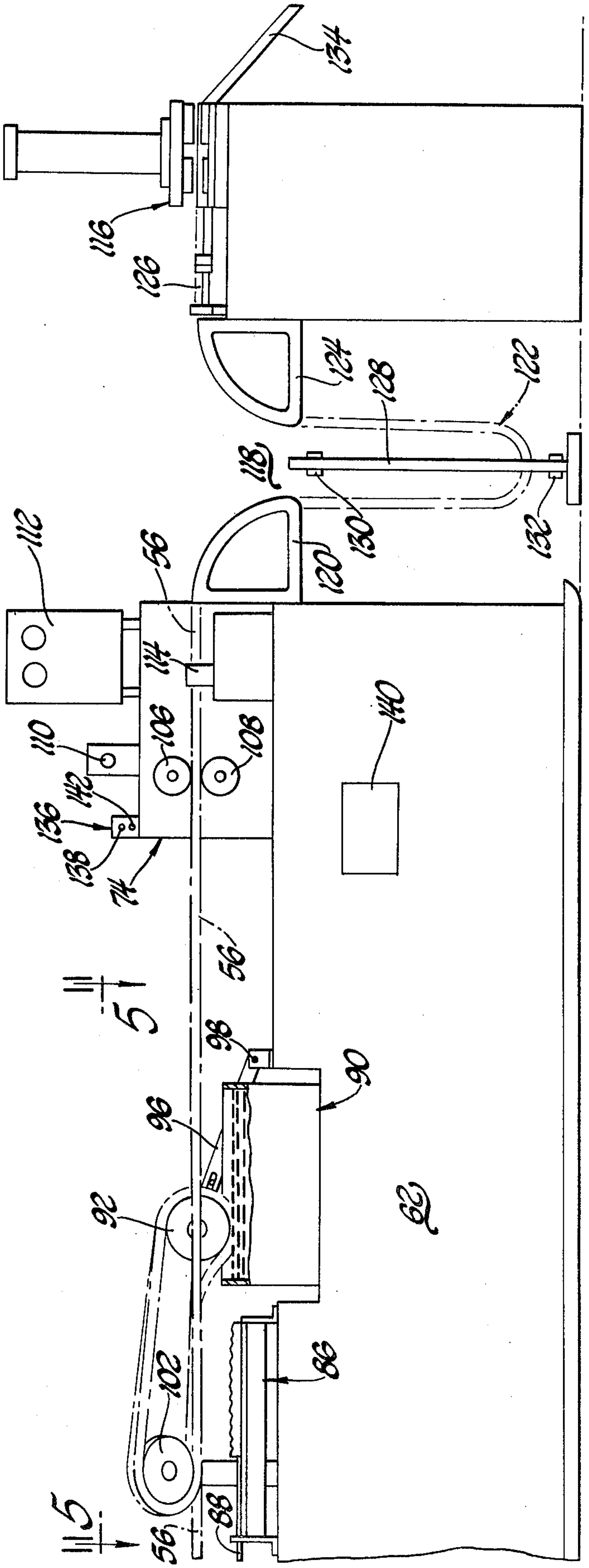
Figure 5:
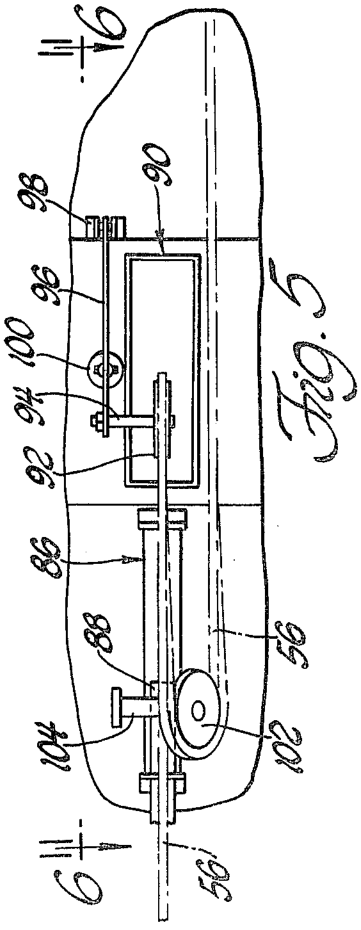

FIGS. 4*a* and 4*b* are enlarged elevational views showing the apparatus in greater detail;

FIG. 5 is a view along lines 5—5 of FIG. 4*b;* and

Figure 6:
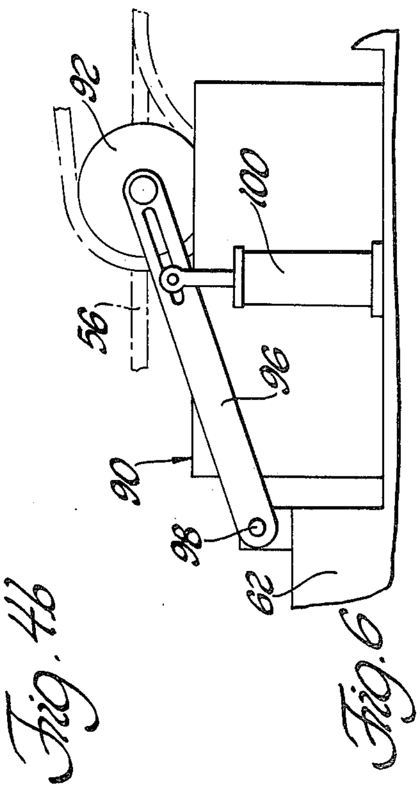

FIG. 6 is a view along lines 6—6 of FIG. 5.

Figure 2:
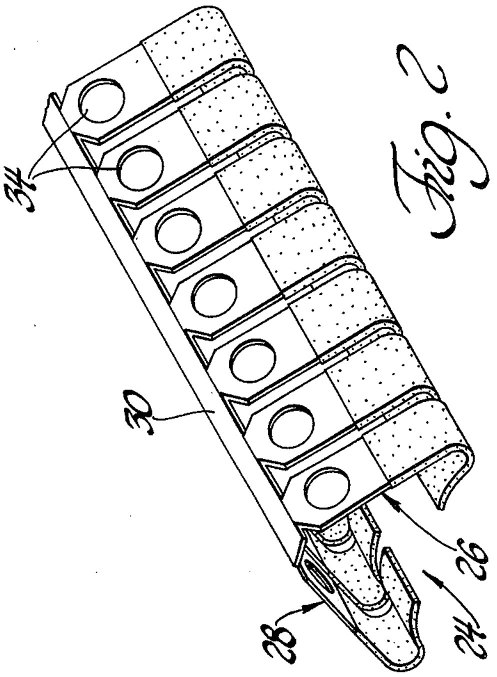
FIG. 1 and 2 illustrate strip sections of U and J type clips.
Figure 1:
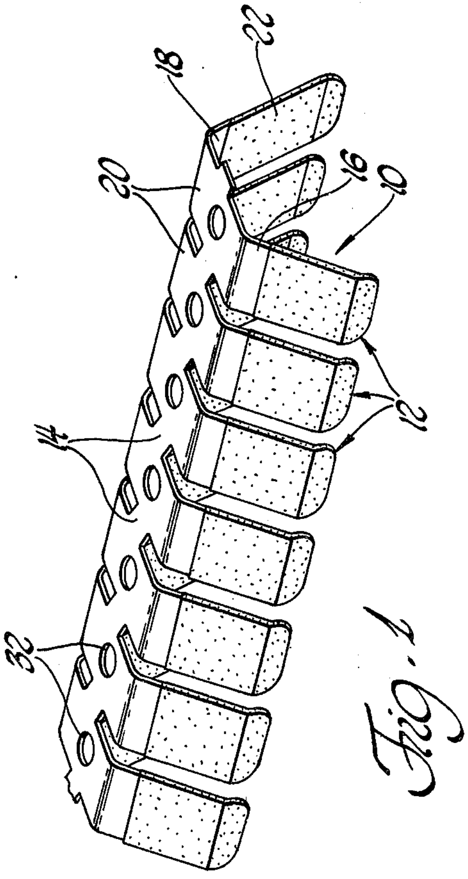
Figure 3:
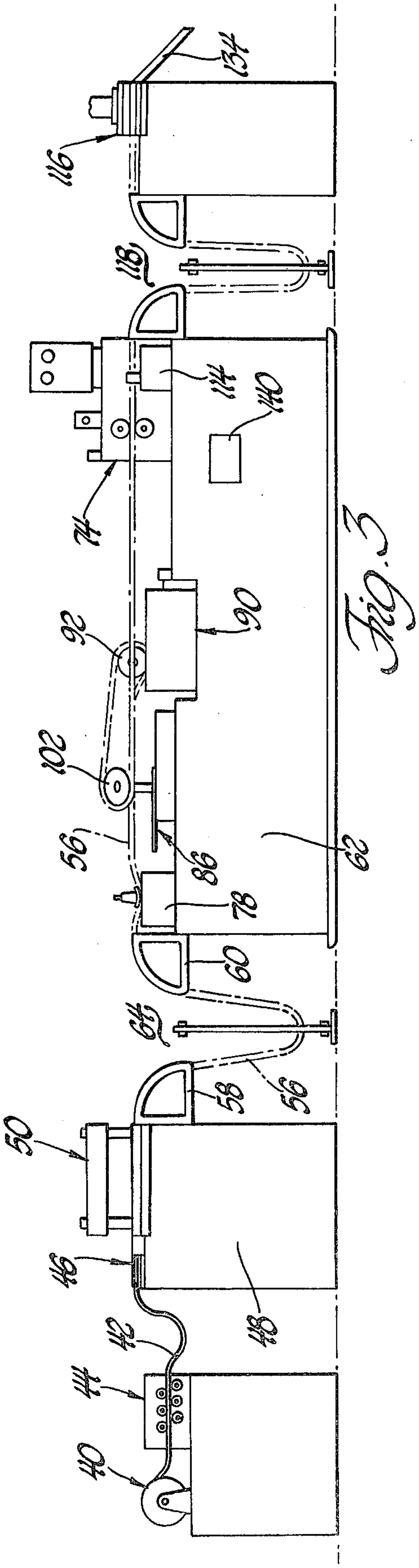
FIG. 3 is an elevational view of the entire clip forming and coating apparatus.

In order to illustrate types of clips commonly made by the subject forming and coating apparatus, reference is made to FIGS. 1 and 2 of the drawings. FIG. 1 represents a section of a continuous strip 10 of U type clips after the clips have been formed and coated but prior to the individual clips being separated from the strip. The individual clips are indicated at 12 and, prior to cut-off, are connected by short tabs 14. Each clip includes leg portions 16 and 18 depending from a transverse interconnecting base portion 20. Leg portions 16 and 18 are coated with a plastic material 22. After the plastic is coated and cured on leg portions 16 and 18, clips 12 are severed from interconnecting tabs 14.

In FIG. 2, a section of a continuous length of J type clips is shown at 24 and includes plastic covered depending leg sections 26 and 28. In this case, identical pairs of J clips are formed on opposite sides of common strip portion 30 from which the clips are severed after the plastic is coated and cured. In the case of both the U and J type clips, when installed they are adapted to be mounted through suitable fastening means which extend through holes 32 and 34 respectively and thereafter the plastic coated legs of the clips are bent around the member to be secured thereby.

The clips shown in FIGS. 1 and 2 are intended to be illustrative of parts which may be produced on the subject apparatus.

Referring now to FIGS. 3 through 6, the clip forming and coating apparatus will now be described in detail in relation to the forming of U shape clips of the type illustrated in FIG. 1. A coil of flat steel stock is indicated at 40. Preferably, the steel strip 42 is of a cold rolled type and, for example, may have a thickness in the range of 0.015 to 0.050 of an inch. The width of the cold rolled strip will vary with the type of clip being formed. For example, a strip having a width of 4 inches and 0.025 thickness is commonly utilized in making U shape type clips. On the other hand, the strip stock commonly used to form J shape clips of FIG. 2 may have a width of 8 inches and a 0.015 thickness. In the illustrated apparatus, steel strip 42 is uncoated and therefore requires priming prior to applying the plastic coating in order to provide a suitable bond between the steel and the plastic. In the event a galvanized or zinc coated steel strip is utilized, then it is possible to eliminate the priming operation and bond the plastic directly upon the coated strip.

Strip stock 42 is fed from coil 40 to an automatic uncoiler and straightening machine indicated generally at 44. As it leaves uncoiler 44, the straightened strip is fed to a precision strip feeder indicated at 46 which, in turn, feeds the strip to a press 48 which includes a progressive forming die 50. Forming die 50 includes fixed and movable platens 52 and 54. Feeder 46 indexes, i.e. intermittently advances, strip 42 between the forming strokes of movable platen 54. As strip 42 is intermittently indexed through progressive die 50 it is variously pierced, slotted, formed, trimmed, and bent such that the strip, as it emerges from the die, is generally of the clip configuration desired for coating, such as either of those illustrated in FIGS. 1 and 2 of the drawings. While not specifically shown in the drawings, the steel strip 42 is sprayed with a lubricating material to facilitate the forming steps through progressive die 50.

Each tab 14 interconnecting the individual clips of FIG. 1 is approximately ⅛ to 3/16 of an inch in length and such tabs maintain the now formed strip 56 in its continuous form to facilitate its passage through the remainder of the apparatus.

While the movement of strip 56 is intermittent as it leaves progressive die 50, it is preferred that the strip move at a continuous or steady rate as it progresses through the plastic coating portion of the apparatus. Accordingly, a first strip accumulator or take-up device is incorporated in the apparatus between the progressive forming die 50 and the plastic depositing station. One such strip accumulator is illustrated at 64. Thus, as it emerges from progressive forming die 50, clip strip 56 follows a downwardly curved guide element 58 mounted upon press 48. A similar upwardly curved guide element 60 is mounted upon support structure 62 in longitudinally spaced relation to guide element 58 and guides the clip strip into the coating portion of the apparatus.

At this point it should be noted that the movement of strip 42–56 as it passes through progressive die 50 is both intermittent and faster than the rate at which the strip flows through the coating portion of the apparatus. In general, the rate of movement through the progressive die is slightly faster than the rate of movement through the coating portion of the apparatus. Further, it is vital for accurately controlling the thickness of the plastic deposited on the leg portions of the clips that the movement of the clip strip 56 be at a continuous and steady rate during the coating operation. Thus, it is necessary to provide some type of mechanism to accommodate the differential speeds at which the strip is being formed and that at which it is being coated. To this end, a first strip accumulator or take-up station 64 is provided and includes a vertically supported arm 66 past which the continuous clip strip 56 moves in passing from guide element 58 to guide element 60. In passing between guide elements 58 and 60, the clip strip forms a variable size depending loop indicated generally at 68. Upper and lower limit switch devices 70 and 72 are mounted on arm 66. Each limit switch device 70 and 72 includes a sensing mechanism such as a photocell and light beam which is adapted to be interrupted by strip 56 as it crosses such beam or device. As already noted, the speed or rate of movement of continuous strip 42-56 through progressive die 50 is greater than the rate at which such strip 56 moves through the coating portion of the apparatus. Thus, the loop portion 68 of strip 56 grows larger or deeper until such time as the strip passes in front of the lower limit switch device 72 at which time the switch shuts off progressive die 50 and coil feeder 44. When the die is shut off, the strip 56 continues to be drawn through the coating portion of the apparatus by means which will be described subsequently, causing loop 68 to diminish in depth until such time as the strip is shortened to the point where it crosses the upper limit switch device 70 which reactivates the progressive die 50 and uncoiler 44, allowing them to resume formation of the clip strip whereby the cycle is repeated with the strip loop once again growing larger or deeper until it again activates lower limit switch 72.

The coating portion of the clip forming apparatus is mounted upon support structure 62 and, as already indicated, includes a clip strip guide element 60 which receives the strip as it is drawn from loop 68 by a traction drive unit indicated generally at 74 and which unit will be subsequently described in greater detail. When a clip strip priming step is required, supra, a pre-heater device or burner 76 is utilized and is disposed subadjacent clip strip 56 as it leaves guide element 60 and immediately prior to its entering the priming station. Where a priming operation is required, the primer material may be applied to the strip 56 in any suitable manner as by spraying, dipping, vaporizing or the like. For illustrative purposes, the primer is applied through a dipping procedure. Pre-heater device 76 dries strip 56 prior to its entering a liquid primer-containing tank 78 and also imparts sufficient residual heat, e.g. 180° F., to the strip to drive off or vaporize any solvents contained in the primer material.

Primer tank 78 contains a primer material which suitably conditions the clips in order to facilitate a satisfactory bond between the metal clip and the plastic coating.

In certain cases it may be desired to apply the primer material to the entire clip to also provide a protective coating to that part of the clip not coated with plastic. In any event, primer tank 78 has a suitable guide element 80 which controls the depth to which the clips are immersed in the primer solution. If only the depending leg portions, e.g. 16 and 18, of the clips are to be coated and further corrosion protection is unnecesary, the clips are only partially immersed in the primer by guide element 80. To this end, depth control guide element 80 includes a vertically adjustable screw member 82 having an arcuate guide element 84 secured thereto. As the clip strip passes along the underside of element 84, the clip leg portions are partially immersed in the primer solution. Because of the residual heat contained in clip strip 56, any primer solvent is vaporized as the strip emerges from primer tank 78.

In order to control the thickness of plastic deposited on each clip, it is necessary to provide a device which accurately controls the heat imparted to the clip strip prior to its immersion into a plastic containing reservoir. Accordingly, a high energy burner or heater, indicated generally at 86, is mounted on support structure 62 and is disposed subadjacent the clip strip 56 as it emerges from primer tank 78. As best seen in FIGS. 4b and 5, heater or burner 86 is of an elongated construction and is approximately 24 inches long. The burner utilizes a pre-mixed gas/air mixture supplied at a constant pressure to a plurality of jets longitudinally aligned parallel to strip 56. The gas/air mixture is adjusted to provide a predetermined flame temperature, e.g. 1800° F. It is important in applying a plastic coating to the clip strip that not only the temperature generated by burner 86 be accurately controlled but also the amount of exposure of the strip to the burner should be regulated. In part, such exposure is regulated by the rate at which the strip moves over burner 86. To permit further control of the heat imparted to clip strip 56, a slide damper 88 is incorporated with burner 86 to vary the effective length thereof. In other words, by sliding the damper 88 longitudinally over the subadjacent gas jets or heating elements, the effective length of the burner may be regulated in conjunction with the strip speed to control the time the strip is exposed to the burner.

It is to be noted that plastic may be applied to the heated strip in any suitable manner as by spraying, dipping, vaporizing or the like. In the embodiment shown, a plastic applying station is disposed immediately downstream of heater 86 and includes a reservoir 90 containing a liquid plastic material such as polyvinyl chloride. A guide element such as rotatable wheel 92 is disposed above the plastic-containing reservoir 90 and is adapted to receive clip strip 56 as it emerges from the hot zone created by burner 86. As best seen in FIG. 5, rotatable guide wheel 92 is mounted upon a laterally extending shaft 94 cantilever supported to a lever arm 96. Lever 96 is pivoted at 98 upon support 62 and is adapted to be adjusted about pivot 98 by a suitable actuating device 100 to raise the lower guide wheel 92 and thus establish the depth to which clip strip 56 is immersed in the plastic-containing reservoir 90. Not only does actuating device 100 determine the extent to which clip strip 56 is immersed in the plastic-containing reservoir 90, but it is also capable of moving the guide wheel and clip strip completely out of the reservoir for purposes which will subsequently be considered.

Depending on the thickness of plastic, e.g. polyvinyl chloride, required and the gauge of strip employed, clip strip 56 is heated to temperatures generally in the range of 600° to 800° F. By varying the parameters of strip temperature and rate of movement, the thickness of the plastic coating may be varied. Obviously, the hotter the strip and the longer the period of its immersion, the thicker the coating. The subject system may be sufficiently accurately controlled to apply coating thicknesses in the range of 0.010 to 0.040 of an inch and to hold such thickness to ± 0.002 of an inch.

While the residual heat in clip strip 56 is normally sufficient to ultimately cure the plastisol coating, it is found that in certain instances the evenness of the coating may be improved and the overall length of the coating apparatus shortened by utilizing a back looping arrangement whereby the plastic coated strip is returned through the exhaust heat zone above burner 86. Such a looping arrangement is particularly advantageous when applying plastic coatings to clips which have a tendency to accumulate or entrap small quantities of plastic as they emerge from the plastic-containing reservoir 90 and, in so doing, tend to form undesired droplets or thickened portions on the clip. The looping arrangement avoids this problem by inverting the strip after coating and thereby redistributing any excess plastic prior to curing. The looping arrangement includes the rotatable guide wheel 92 disposed above the plastic-containing reservoir 90 and a second rotatable guide wheel 102 disposed upstream of the reservoir and vertically spaced above high energy heater 86. Rotatable wheel 102 is supported through an upwardly inclined shaft 104 and is adapted to receive the plastic coated strip 56 as it leaves the upper portion of guide wheel 92 to redirect the coated strip over the exhaust heat zone generated by high energy burner 86 to accelerate the cure of the plastic. In addition to accelerating the cure of the plastic deposited on the clips, by inverting clip strip 56 as it emerges from reservoir 90, any excess liquid plastic is caused to flow back up the clip legs thereby evening out the plastic and preventing the formation of undesired droplets.

As best seen in FIG. 5, the upward tilt of shaft 104 causes guide wheel 102 to be inclined relative to guide wheel 92 whereby, as the coated clip strip leaves wheel 102, it is laterally offset relative to burner 86 and the hot air zone created thereby. The lateral offset of the clip strip as it resumes its downstream travel assures non-interference with the uncoated strip as it originally enters the high heat zone and also prevents overheating of the cured plastic.

As the coated and cured clip strip 56 completes its loop around guide wheel 102, it once again continues its downstream movement and passes into the variable speed traction drive device 74. Device 74 includes upper and lower rotating wheels 106 and 108 which provide the force continuously pulling the strip through the coating portion of the apparatus. Lower drive wheel 108 includes a knurled outer surface which drives the strip forwardly as it is pinched between the top idler wheel 106. Drive mechanism 74 includes a suitable variable speed control switch 110 which, through mechanism 112, regulates the speed of drive wheel 108. Since the central portion, e.g. 14-20, of clip strip 56 is not coated with plastic, it is this portion of the strip against which traction drive wheels 106 and 108 clampingly impinge to move the strip through the apparatus.

As the plastic coated strip 56 emerges from traction drive device, 74, it passes through a suitable water chilling mechanism 114 which cools the coated strip prior to reaching the clip cut-off die 116.

Once again, since the speed or rate at which clip strip 56 flows through cut-off die 116 is faster than that at which the strip is moving through the coating operation, a second take-up device, indicated generally at 118, is provided. A first downwardly curved guide element 120 is provided to receive the strip as it leaves water cooling device 114. The strip 56 once again forms a loop indicated generally at 122, and moves up a second upwardly curved guide device 124 and into a precision strip feeder mechanism 126 which intermittently feeds the strip into cut-off die 116. Referring to second take-up station or device, once again a vertical element or support arm 128 is disposed between strip guide elements 120 and 124 and includes upper and lower limit switch sensors 130 and 132. Since the speed of movement through cut-off guide 116 is faster than the rate at which the strip is emerging from the coating operation, strip loop 122 tends to be foreshortened or diminished in depth until such time as the strip passes the upper limit switch 130, at which time the sensor stops the operation of cut-off die 116, allowing the loop to once again build up in size or depth until such time as the loop passes in front of the lower sensor 132, at which time the cut-off die 116 is once again actuated.

Cut-off die 116 shears clips 12 from interconnecting tabs 14 enabling the now completed clips to drop through chute 134 into a suitable packaging carton, not shown.

While performing the noted clip cut-off function, die 116 can also be utilized to perform various post-coating forming operations. For example, after forming and coating J clips of the type shown in FIG. 2, die 116 bends the legs 26 and 28 upwardly so as to be horizontal or generally coplanar with connecting strip 30 immediately prior to cut-off of the clips and thereby assuring a clean sheared edge. Likewise, clip holes 32 or 34 could either be formed or enlarged in die 116. Another important aspect of the subject apparatus is the control system whereby the clip forming and coating apparatus is sequenced in starting-up or shutting down. The sequencing operation saves energy and thus reduces the cost of producing clips and also reduces to a minimum the number of clips that are wasted in the shut-down/start-up cycle.

The start-stop control for the subject apparatus is indicated generally at 136. Both to save energy and materials, a precise starting sequence is desired. When start button 138 is pushed, a pilot light in the high energy burner 86 is electrically activated which, in turn, ignites the burner. After a predetermined number of seconds to bring the clip strip up to the required dipping temperature, e.g. 600° to 800° F., the variable traction feed control unit 74 starts the strip moving. Once the strip reaches its predetermined speed and is at the required temperature, then hydraulic control 100 is actuated to lower the dipping guide wheel 92 to a predetermined depth to appropriately immerse strip 56 in the plastic material contained in reservoir 90. The sequencing cycle is attained by using time controlled relays connected in series and disposed in a control panel 140 mounted on support 62. As the clip strip begins to move through the coating portion of the apparatus, forming and cut-off dies 50 and 116 will be started in accordance with the position of strip loops 68 and 122 in take-up devices 64 and 118 as previously described.

When stop control button 142 is actuated to shut down the operation of the apparatus, the reverse of the start-up cycle is performed. First, dipping guide wheel 92 is raised out of reservoir 90. Next, the high energy burner 86 is turned off and variable traction drive unit 74 is stopped. When strip 56 stops moving, take-up units 64 and 118 will respectively stop the operation of dies 50 and 116 as described.

Since the high energy burner 86 is operative only when clips are being produced by the apparatus, it is apparent that considerable energy is saved as compared to prior systems which utilize larger type ovens which are frequently maintained in operation during a working shift whether or not the apparatus is introducing parts. Also, as compared to systems using large clip curing furnaces requiring a considerable warm-up period at the beginning of each day's operation, the subject system can be started very rapidly from the time the start button is energized.

During each start-up or shut-down cycle of the present apparatus, it is found that approximately 6 to 12 inches of the strip, or generally not over a dozen clips, are wasted due to not being coated. Such loss is obviously insignificant with an apparatus producing a minimum of 120,000 clips during a normal eight-hour shift.

It is apparent that other modifications of the illustrated invention may be made within the intended scope of the hereinafter appended claims.

What is claimed is:

1. An apparatus for forming and coating parts comprising a first forming die, means for supplying metal stock to said die, said die being intermittently actuated to form a plurality of metal parts having depending portions, said formed parts being interconnected by integral tabs so as to form a continuous and flexible part strip, a part coating station downstream of said forming die, a mechanism for drivingly engaging and moving said part strip at a continuous rate of feed through said part coating station, the rate of movement of said part strip from said forming die being different than its rate of movement through said coating station, a first strip accumulator device disposed between said forming die and said coating station to control the operation of said forming die and to regulate the quantity of formed part strip supplied to said coating station, said coating station including a high energy heating device, guide means for conveying said part strip proximately over said heating device to heat the depending portions of said strip parts, means for applying a plastic coating to the heated depending portions of said part strip, a second die downstream of said coating station for severing said parts from said strip, means for intermittently feeding said plastic coated part strip to said second die, the rate of movement of said part strip through said coating station being different than its rate of movement through said second die, and a second strip accumulator disposed between said coating station and said second die to control the operation of said second die and to regulate the quantity of plastic coated part strip fed thereto.

2. An apparatus as set forth in claim 1 wherein said plastic coating applying means comprises a plastic containing reservoir disposed adjacent to said high energy heating device, a first guide element disposed above said reservoir for receiving said heated part strip and directing said strip within said reservoir whereby the heated depending portions of said parts are coated with plastic.

3. An apparatus as set forth in claim 2 wherein said plastic coating applying means includes a power actuated device for controlling the vertical position of said first guide element relative to said reservoir.

4. an apparatus as set forth in claim 2 wherein said plastic coating applying means includes a second guide element disposed above said heating device and receiving the plastic coated parts from said first guide element, said first and second guide elements coacting to invert said plastic coated part strip whereby the depending portions of the strip project above the integral tabs as said coated strip passes from said first guide element to said second guide element.

5. An apparatus as set forth in claim 4 wherein said first and second guide elements are rotatable wheels which coact to guide said plastic coated part strip in a loop path extending above the reservoir and heating device, said strip loop path including an upper portion moving upstream from said first guide element and a lower portion moving downstream from said second guide element toward said second die element.

6. An apparatus as set forth in claim 5 wherein the axis of said second rotatable guide wheel is inclined to the axis of said first rotatable guide wheel whereby the lower portion of said plastic coated strip loop portion is laterally offset relative to said heater device.

7. An apparatus as set forth in claim 1 wherein said coating applying station includes a device for applying a primer coating to said formed part strip prior to the application of the plastic coating thereto.

8. An apparatus as set forth in claim 7 wherein the primer applying device includes a primer containing reservoir, means immediately upstream of said primer containing reservoir for pre-heating said part strip, and guide means for immersing said pre-heated strip in said reservoir to control the extent to which said parts are coated with said primer.

9. An apparatus as set forth in claim 1 wherein the strip engaging and moving mechanism is disposed between said plastic coating station and said second strip accumulator.

10. An apparatus for forming and coating parts comprising a first forming die, means for supplying metal stock to said die, said die being intermittently actuated to form a plurality of parts having depending portions, said formed parts being interconnected by integral tabs so as to form a continuous and flexible part strip, a part coating station downstream of said forming die, a mechanism for drivingly engaging and moving said part strip at a continuous rate of feed through said part coating station, the rate of movement of said part strip from said forming die being different than its rate of movement through said coating station, a first strip accumulator device disposed between said forming die and said coating station to control the operation of said forming die and to regulate the quantity of formed part strip supplied to said coating station, said coating station including a high energy heating device, guide means for conveying said part strip proximately over said heating device to heat the depending portions of said strip parts, means for applying a plastic coating to the heated depending portions of said part strip, a second die downstream of said coating station for severing said parts from said strip, means for intermittently feeding said plastic coated part strip to said second die, the rate of movement of said part strip through said coating station being different than its rate of movement through said second die, a second strip accumulator disposed between said coating station and said second die to control the operation of said second die and to regulate the quantity of plastic coated part strip fed thereto, and a sequencing device whereby upon start-up of said apparatus the high energy heating device is first ignited to heat the superadjacent portion of said part strip, next, the strip engaging and moving mechanism is energized to move the strip through the part coating station, and finally, the plastic coating applying means is energized to deposit plastic on the heated depending portions of said part strip.

11. An apparatus for forming and coating parts comprising a first forming die, means for supplying metal stock to said die, said die being intermittently actuated to form a plurality of parts having depending portions, said formed parts being interconnected by integral tabs so as to form a continuous and flexible part strip, a part coating station downstream of said forming die, a mechanism for drivingly engaging and moving said part strip at a continuous rate of feed through said part coating station, the rate of movement of said part strip form said forming die being different than its rate of movement through said coating station, a first strip accumulator device disposed between said forming die and said coating station to control the operation of said forming die and to regulate the quantity of formed part strip supplied to said coating station, said coating station including a high energy heating device, guide means for conveying said strip proximately over said heating device to heat the depending portions of said strip parts, means for applying a plastic coating to the heated depending portions of said part strip, a second die downstream of said coating station for severing said parts from said strip, means for inverting the part strip immediately after applying the plastic coating thereto and causing the inverted and coated strip to pass over said high energy heat device prior to said strip entering said second die, means for intermittently feeding said plastic coated part strip to said second die, the rate of movement of said part strip through said coating station being different than its rate of movement through said second die, and a second strip accumulator disposed between said coating station and said second die to control the operation of said second die and to regulate the quantity of plastic coated part strip fed thereto.

12. An apparatus for forming and coating parts comprising a forming die, means for supplying metal stock to said die, said die intermittently actuated to form a plurality of parts having depending portions, said formed parts being interconnected by integral tabs so as to form a continuous and flexible strip, first and second means receiving the part strip from the die and for respectively guiding said strip in downwardly and upwardly directions so as to form a depending U shape loop therebetween, a mechanism drivingly engaging and moving said part strip at a continuous rate of feed over the second guiding means, the rate of feed of said strip through said forming die being faster than the rate of feed of the part strip over said second guiding means, a forming die control device disposed between said first and second strip guiding means and including a pair of vertically spaced sensors, the lower sensor being adapted to shut off the forming die when the bottom of the U shape strip loop is proximate thereto, the upper sensor being adapted to restart the forming die when the bottom of the U shape strip loop is proximate thereto, a burner device for heating the depending portions of said parts, a plastic containing reservoir adjacent said burner device, a guide means receiving said strip and immersing the heated depending portions in the plastic containing reservoir whereby said portions are coated with plastic, third and fourth means for respectively guiding the plastic coated strip in downwardly and upwardly directions so as to form a depending U shape loop therebetween, a die for severing the individual coated parts from said strip, means for intermittently feeding said coated strip from the fourth guiding means to the severing die at a rate faster than said strip moves over the third guiding means, a severing die controlling device disposed between said third and fourth guiding means and including a pair of vertically spaced sensors, the upper sensor being adapted to shut off the severing die and its intermittent feeding means when the bottom of the U shape loop is proximate thereto, the lower sensor being adapted to restart the severing die when the bottom of the U shape loop is proximate thereto.

13. An apparatus as set forth in claim 12 wherein said burner device is mounted proximately beneath said part strip and includes heating elements aligned parallel to said strip.

14. An apparatus as set forth in claim 13 wherein said burner device includes a slide damper adapted to cover certain of said heating elements to change the effective heating length of said burner device.

15. An apparatus for forming and coating parts comprising a forming die, means for supplying metal stock to said die, said die being intermittently actuated to form a plurality of parts having depending portions, said formed parts being interconnected by integral tabs so as to form a continuous and flexible strip, first and second means receiving the part strip from the die and for respectivly guiding said strip in downwardly and upwardly directions so as to form a depending U shape loop therebetween, a mechanism drivingly engaging and moving said part strip at a continuous rate of feed over the second guiding means, the rate of feed of said strip through said forming die being faster than the rate of feed of the strip over said second guiding means, a forming die control device disposed between said first and second strip guiding means and including a pair of vertically spaced sensors, the lower being adapted to shut off the forming die when the bottom of the U shape strip loop is proximate thereto, the upper sensor being adapted to restart the forming die when the bottom of the U shape strip loop is proximate thereto, means for applying a primer coating to said part strip, a high energy burner device for heating said primed strip, a plastic containing reservoir adjacent said burner device, a guide means receiving said heated strip and immersing the primed part leg portions in the plastic containing reservoir whereby the depending portions of said part strip are coated with plastic, third and fourth means for respectivly guiding the plastic coated strip in downwardly and upwardly directions so as to form a depending U shape loop therebetween, a die for severing the individual coated parts from said strip, means for intermittently feeding said coated strip from the fourth guiding means to the severing die at a rate faster than said strip moves over the third guiding means, a severing die controlling device disposed between said third and fourth guiding means and including a pair of vertically spaced sensors, the upper sensor being adapted to shut off the cut-off die when the bottom of the U shape loop is proximate thereto, the lower sensor being adapted to restart the severing die when the bottom of the U shape loop is proximate thereto.

16. An apparatus as set forth in claim 15 wherein the primer applying means comprises a liquid primer containing tank disposed proximate the second guiding means and an adjustable guide element receiving said part strip and immersing the part leg portions in the liquid primer.

17. An apparatus as set forth in claim 16 wherein the primer applying means includes a device disposed intermediate said second guiding means and said primer containing tank for preheating said part strip prior to the immersion of said part leg portions into said liquid primer.

18. An apparatus as set forth in claim 15 wherein said high energy burner device is mounted proximately beneath said part strip and includes heating elements aligned parallel to said strip.

19. An apparatus as set forth in claim 18 wherein said high energy burner device includes a slide damper adapted to cover certain of said heating elements to change the effective heating length of said burner device.

20. An apparatus as set forth in claim 12 wherein the guide means for immersing the depending part portions in the plastic containing reservoir comprises an arm pivoted at one end proximate to said reservoir, a part strip receiving guide wheel rotatably mounted on said arm so as to overlay said reservior, and an actuating device connected to said arm to control the vertical position of said guide wheel and thereby the extent to which the depending part portions are immersed in said reservoir.

21. An apparatus for forming and coating parts comprising a progressive forming die, means for supplying metal stock to said die, said die being intermittently actuated to form a plurality of parts having depending portions, said formed parts being interconnected by integral tabs so as to form a continuous and flexible strip, means for applying a plastic coating to the depending portions of said part strip, a high energy burner device for heating said part strip immediately prior to the application of said plastic coating, means for engaging and pulling said part strip through said plastic coating applying means at a continuous and constant speed, means for controlling the rate of strip flow through said progressive forming die to facilitate the continuous flow of said strip through said plastic coating applying means, a die for severing the individual coated parts from said strip, and means for controlling the rate of operation of said severing die to accommodate the continuous flow of said strip through said plastic coating applying means.

22. An apparatus for forming and coating parts comprising a progressive forming die, means for supplying metal stock to said die, said die being intermittently actuated to form a plurality of parts having depending portions, said formed parts being interconnected by integral tabs so as to form a continuous and flexible strip, a plastic containing reservoir, a first guide means for engaging and immersing the depending part portions in said reservoir, a burner device adjacent said reservoir for heating said strip immediately prior to its immersion in said plastic containing reservoir, means for engaging and pulling said clip strip through said reservoir at a continuous speed, a second guide means receiving the plastic coated strip as it leaves said reservoir and coacting with said first guide means to redirect said plastic coated strip through the heat zone above the burner device and above the heated part strip prior to the latter's immersion in the reservoir, means for controlling the rate of strip flow through said progressive forming die to facilitate the continuous flow of said strip through said plastic containing reservoir, a die for severing the individual coated parts from said strip, and means for controlling the rate of operation of said severing die to accommodate the continuous flow of the plastic coated strip through said reservoir.

23. An apparatus as set forth in claim 22 wherein the first and second guide means are rotatable and longitudinally spaced wheels.

24. An apparatus as set forth in claim 23 wherein the plastic coated strip is inverted as it leaves said first guide wheel means whereby any excess liquid plastic tends to flow away from the lower ends of the depending portions toward the uncoated portions of the parts.

25. An apparatus as set forth in claim 24 wherein the rotative axis of the second guide wheel is inclined to that of the first guide wheel whereby the plastic coated strip is laterally offset from the uncoated strip as it progresses to the strip pulling means.

* * * * *

UNITED STATES PATENT AND TRADEMARK OFFICE
CERTIFICATE OF CORRECTION

PATENT NO. : 4,130,933

DATED : December 26, 1978

INVENTOR(S) : Carl J. Demrick

It is certified that error appears in the above-identified patent and that said Letters Patent are hereby corrected as shown below:

Column 2, lines 26-29
after "apparatus" delete "a first take-up device or strip accumulator is provided intermediate the progressive die and the coating portion of the apparatus".

Column 2, line 40 "of"
should be --at--.

Column 9, line 8
"introducing" should be --producing--.

Column 11, line 21 after
"said" (1st instance) insert --part--.

Column 11, line 40 after
"die" (2nd instance) insert --being--.

Column 12, line 26
"respectivly" should be --respectively--.

Column 12, line 35 after
"lower" insert --sensor--.

UNITED STATES PATENT AND TRADEMARK OFFICE
CERTIFICATE OF CORRECTION

PATENT NO. : 4,130,933
DATED : December 26, 1978
INVENTOR(S) : Carl J. Demrick

It is certified that error appears in the above-identified patent and that said Letters Patent are hereby corrected as shown below:

Column 12, line 49
"respectivly" should be --respectively--.

Signed and Sealed this

*First* Day of *May 1979*

[SEAL]

*Attest:*

RUTH C. MASON
*Attesting Officer*

DONALD W. BANNER
*Commissioner of Patents and Trademarks*